United States Patent [19]

Kim

[11] Patent Number: 5,676,470

[45] Date of Patent: Oct. 14, 1997

[54] CROSSFLOW FAN SUPPORTING DEVICE FOR AN AIR CONDITIONER

[75] Inventor: Dae Dong Kim, Suwon, Rep. of Korea

[73] Assignee: Samsung Electronics Co., Ltd., Suwon, Rep. of Korea

[21] Appl. No.: 713,518

[22] Filed: Sep. 13, 1996

[30] Foreign Application Priority Data

Sep. 14, 1955 [KR] Rep. of Korea ............... UM95-24763

[51] Int. Cl.6 ........................... F16C 13/02; F04D 5/00
[52] U.S. Cl. ........................... 384/416; 384/206; 415/53.1
[58] Field of Search ................................. 384/192, 206, 384/202, 203, 208, 215, 220, 295, 416, 418, 419, 428; 415/53.1, 53.2, 53.3, 229

[56] References Cited

U.S. PATENT DOCUMENTS

| | | | |
|---|---|---|---|
| 2,717,792 | 9/1955 | Pelley | 384/215 X |
| 3,188,061 | 6/1965 | Alguire | 384/416 X |
| 3,306,526 | 2/1967 | Laing | 415/53.1 X |
| 3,821,861 | 7/1974 | Strang | 384/206 |
| 4,032,254 | 6/1977 | Bentz et al. | 415/53.3 |
| 5,127,238 | 7/1992 | Ichikawa et al. | 415/53.1 |

*Primary Examiner*—Thomas R. Hannon
*Attorney, Agent, or Firm*—Burns, Doane, Swecker & Mathis, L.L.P.

[57] ABSTRACT

An air conditioner includes a housing body in which are disposed a heat exchanger, a fan for circulating air across the heat exchanger, and a motor connected to one end of the fan for rotating the fan about an axis. Integrally formed on an opposite end of the fan is a bearing housing in which a bearing is disposed. The bearing has a center hole aligned with the axis. A bracket affixed to the housing includes a shaft which extends toward the fan and extends through the center hole of the bearing to rotatably support the fan.

5 Claims, 4 Drawing Sheets

CROSSFLOW FAN SUPPORTING DEVICE FOR AN AIR CONDITIONER

BACKGROUND OF THE INVENTION

1. Field of the Invention

The present invention relates to an air conditioner. More particularly, it relates to an improved cross-flow fan supporting device of an air conditioner.

2. Description of the Related Art

Most modern refrigeration air conditioners that change the quality of indoor air make use of compressor cooling systems. These systems employ a refrigerant that is alternatively compressed and expanded, and the refrigerant takes the form of gas part of time and liquid part of time through a series of compression, condensation, expansion, and evaporation.

The air conditioners are divided into indoor and outdoor units. The indoor unit contains an evaporator and a ventilating fan. Indoor air is circulated by the ventilating fan and is diluted with fresh air while passing through the evaporator in order to be changed into cool air. This air is pumped into the indoors thereby accomplishing air cooling.

In the meantime, the outdoor unit contains a compressor, a condenser and a cooling fan. As the cooling fan is actuated, outdoor air is forced to flow into the condenser, and the refrigerant passing through the condenser becomes condensed. FIG. 3 depicts an exploded perspective view of a common type of an indoor unit used for an air conditioner.

A body or housing 10 that forms an outward appearance of the indoor unit includes a front panel 11 and a backside panel 15. The front panel 11 includes a room air intake 12 and a cool air outlet 13. An evaporator 20 and a ventilating fan 30 are installed within the body 10. A low-temperature refrigerant flows through an internal passage of the evaporator 20 interposed between the air intake 12 and the ventilating fan 30, and is heat-exchanged with air that is circulated through the evaporator 20 by the ventilating fan 30.

A driving motor 32 is coupled to one end of the ventilating fan 30 provided to the backside panel 15 so as to rotate the ventilating fan 30, and a rotary shaft 31 is provided at the other end of the ventilating fan 30. In order to support the rotary shaft 31 rotatably, a fan supporting device 40 is mounted on the sidewall of the backside panel 15.

FIG. 4 depicts a conventional fan supporting device 40. As shown in FIG. 4, the conventional fan supporting device 40 includes a bearing 41, a bearing housing 42 that encloses the bearing 41, and a bracket 43 that supports the bearing housing 42. The bearing housing 42 is formed of synthetic resin by injection molding, and has an insert hole 44 formed in its central portion.

The bearing 41 which is made of rubber is forcibly inserted into the insert hole 44. A plurality of concavities 45 are formed on the upper and lower parts of the bearing housing 42. The bracket 43 has projections 46 that each correspond to one of the concavities 45, and the bearing housing 42 is tightly fitted into the bracket 43 so that the concavities 45 of the bearing housing 42 and the projections 46 of the bracket 43 can fit together. The bracket 43 has a pair of screw holes 47 so that the bracket 43 can be attached to the inside of the body 10.

The following description concerns the coupling of the ventilating fan 30 to the conventional fan supporting device 40.

The bearing housing 42 holding the bearing 41 is fitted into the bracket 43, and the rotary shaft 31 of the ventilating fan 30 is inserted into a center apeture 44' of the bearing 41. At this point, the fan supporting device 40 is then screwed to the inside of the body 10 via the screw holes 47, thereby completing the assembly of the ventilating fan 30 to the body 10.

In such a conventional crossflow fan supporting device 40, the bearing housing 42, and bearing 41 are too narrow in width i.e.,in a direction parallel to the shaft axis to properly hold the rotary shaft 31 in the insert hole 44. Therefore, when shock is applied to an air conditioner with the above crossflow fan supporting device 40 by careless handling, the ventilating fan 30 is easily separated from the fan supporting device 40. If the bearing housing 42 were designed to be larger in width so that the rotary shaft 31 could more deeply inserted into the hole 44 of the bearing housing 42, the above-mentioned problem may be precluded. This solution, however, would increase the size of the bearing housing 42 to raise overall production costs. Besides, the air conditioner would be increased in width to take up much space in indoor places.

A length-control bracket (not shown) whose size is varied with the capacity of an air conditioner is provided to the opposite side of the fan supporting device 40 to establish a desired length for the portion of the rotary shaft 31 which projects into the supporting device. Air conditioners with different capacities are manufactured on the air conditioner fabrication line, however, and when a worker mistakenly installs a length-control bracket whose size does not correspond to the capacity of air conditioner, the rotary shaft 31 cannot be accurately inserted into the bearing housing 42. In other words, if the rotary shaft 31 is too deeply inserted into the insert hole 44 of the bearing housing 42, the end of the rotary shaft 31 comes into contact with the bearing housing, thereby making noise. On the contrary, if the rotary shaft 31 is to shallowly inserted into the insert hole 44, the rotary shaft 31 is easily separated from the bearing housing 42.

In the conventional fan supporting device 40, the bearing housing 42 is manually joined into the bracket 43, and an adhesive substance is applied to their joints in order to provide safer coupling. This technique, however, has the disadvantages of a complication of manufacturing operations and frequent occurrence of defects in workmanship due to handwork, which lowers productivity.

SUMMARY OF THE INVENTION

Accordingly, the present invention relates to a crossflow fan supporting device of an air conditioner that substantially overcome one or more of the problems of the related art.

It is an object of the present invention to provide an improved crossflow fan supporting device of an air conditioner that can preclude dislodgement of a crossflow fan from the body of the air conditioner and minimize defects in workmanship and fabrication hours.

To achieve this and other advantages in accordance with the purpose of the present invention, as embodied and broadly described, the inventive crossflow fan supporting device of an air conditioner with a body and a crossflow fan having a driving motor coupled to its one end, includes a bearing housing having an insert hole in the central portion and a bearing installed in the insert hole and joined to the other end of the crossflow fan; a bracket fixed to the inside of the body; and a shaft extending toward the inside of the body from the bracket and inserted into the insert hole of the bearing housing.

The bearing housing is formed to be an integral part of the crossflow fan by insert-injection molding. The shaft is long enough to be deeply inserted into the crossflow fan, passing through the bearing housing.

By using the inventive crossflow fan supporting device, the crossflow fan cannot be easily separated from the body of the air conditioner by a carrier's careless handling, and enhances users' confidence in to the product. Therefore, the present invention can reduce assembling hours and prevent defects in workmanship, which offers enhanced productivity.

BRIEF DESCRIPTION OF THE DRAWINGS

The above objects and other advantages of the present invention will become more apparent upon consideration of presently preferred embodiments of the present invention with reference to the attached drawings in which.

DETAILED DESCRIPTION OF THE PREFERRED EMBODIMENT

Figure 1:
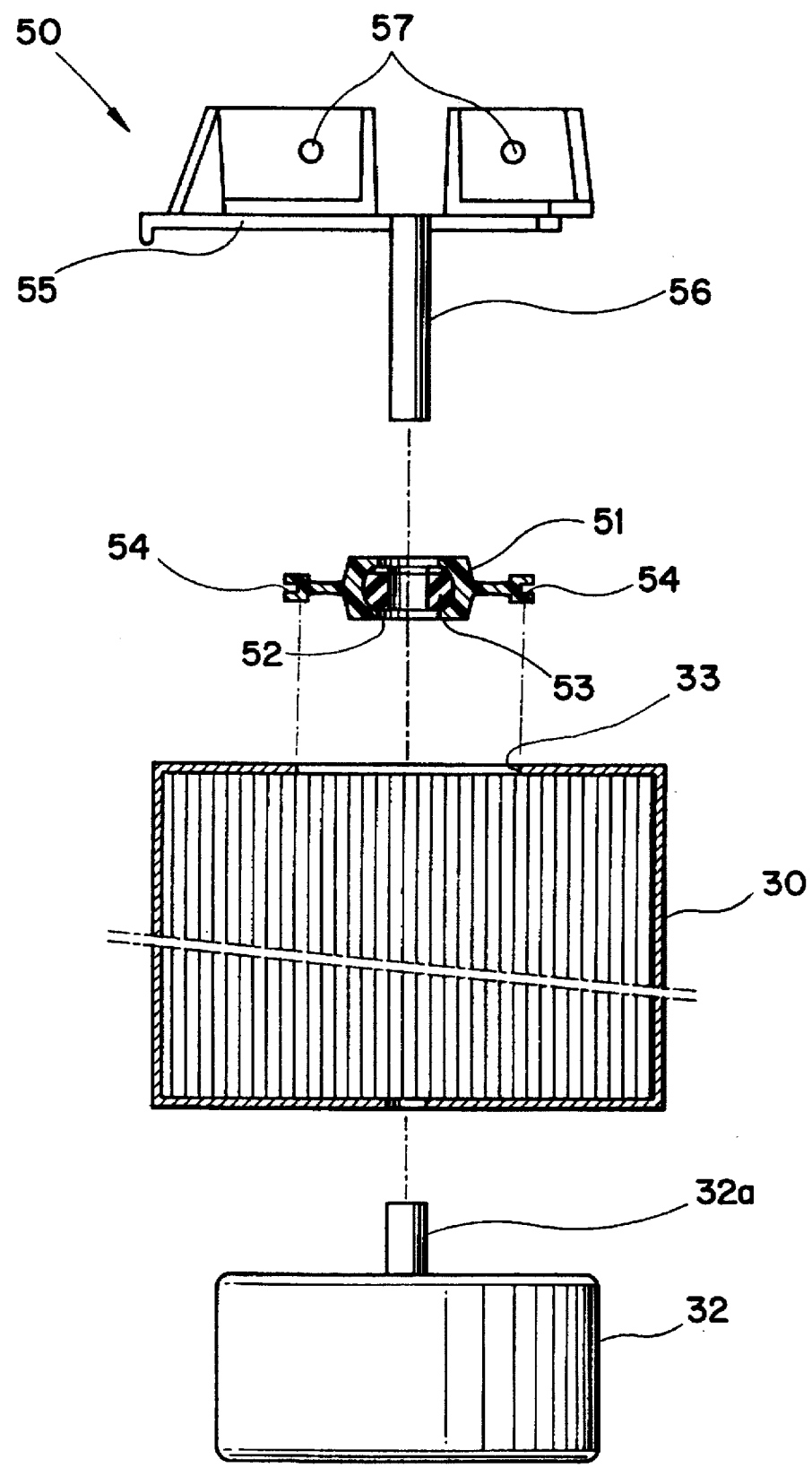
FIG. 1 is an exploded view of a crossflow fan supporting device in accordance with the present invention.

A preferred embodiment of the present invention will now be discussed in detail with reference to the accompanying drawings. Throughout the drawings and the specification, similar reference numerals denote similar elements. Furthermore, redundant descriptions of features common between the conventional system and preferred embodiment of the present invention are omitted.

FIG. 1 is an exploded view of a crossflow fan supporting device 50 in accordance with the present invention.

As depicted in FIG. 1, the crossflow fan supporting device 50 includes a bearing housing 51 and a bracket 55. The bearing housing 51 has an insert hole 52 in the central portion. A bearing 53 made of rubber is forcedly fitted into the insert hole 52.

Coupling concavities 54 are respectively formed on both ends of the bearing housing 51. The bracket 55 has a shaft 56 that is an integral part of the front of the bracket 55 and extends perpendicularly therefrom. A pair of screw holes 57 are formed on the reverse of the bracket 55 so that the bracket 55 can be screwed to the air conditioner body 10 or housing.

Figure 2:
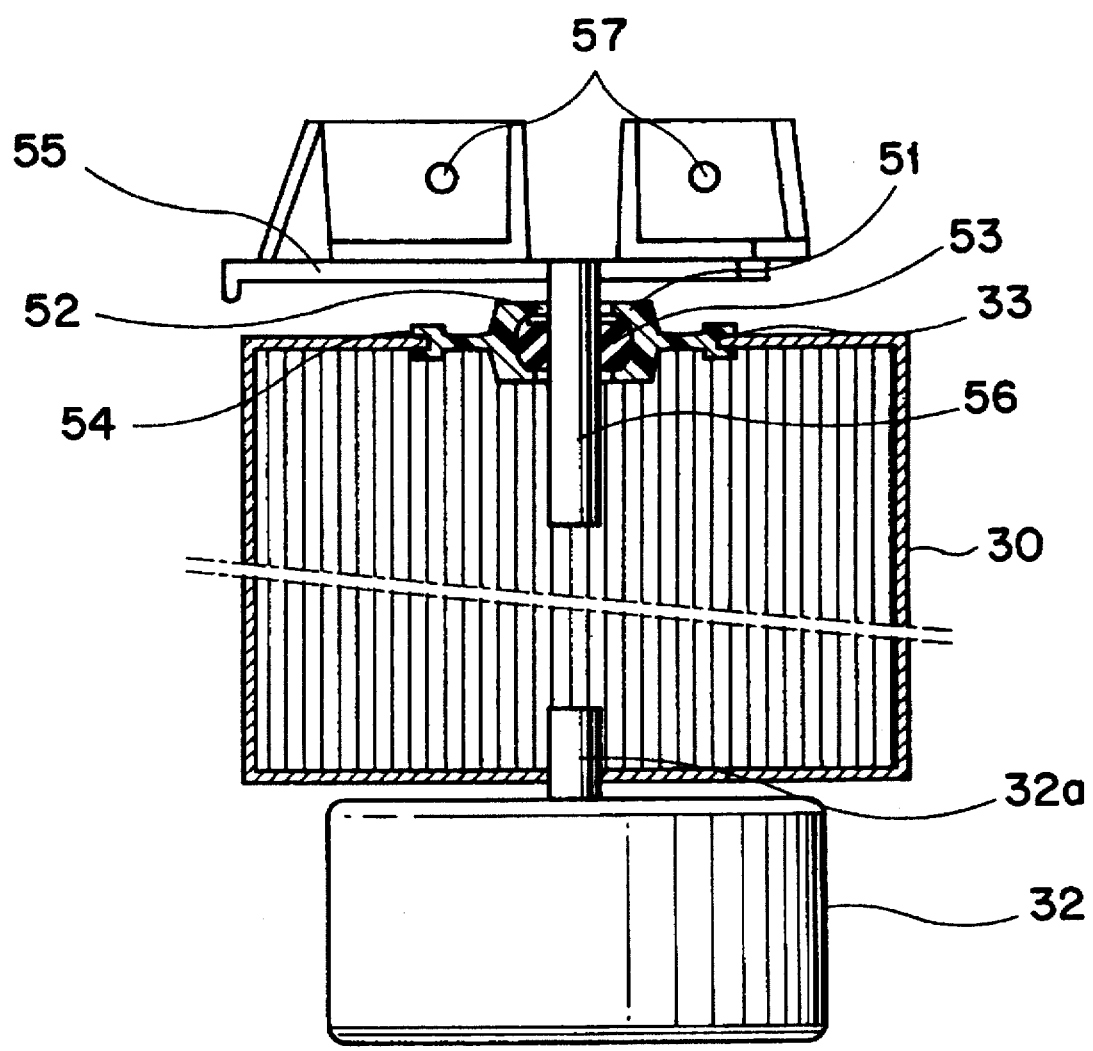
FIG. 2 depicts the crossflow fan supporting device of FIG. 1 which is joined to a crossflow fan.

FIG. 2 depicts the crossflow fan supporting device 50 of FIG. 1 that is coupled to a crossflow fan 30. The bearing housing 51 holding the bearing 53 is disposed within an opening 33 formed on one side of the crossflow fan 30. The shaft 56 that extends from the bracket 55 is deeply inserted into the inside of the crossflow fan 30, passing through the insert hole 52 which is formed in the central portion of the bearing housing 51. A spindle 32a of a driving motor 32 is tightly fitted into the other side of the crossflow fan 30, and this driving motor 32 is coupled to the inside of the body 10 of the air conditioner.

The following description relates to the coupling of the crossflow fan supporting device 50 to the crossflow fan 30 and body 10.

The bearing housing 51 is formed to be an integral part of the crossflow fan 30 by insert-injection molding. Compared to a conventional bearing housing that is manually fitted into a bracket, such an assembly operation is automatically performed within a short period of time, thereby obtaining advantages of the enhancement in productivity and prevention of erroneous assembling. The shaft 56 is formed to be an integral part of the bracket 55 also by injection molding. The shaft 56 is inserted into the insert hole 52 of the bearing housing 51 while the driving motor 32 and the bearing housing 51 are being coupled to respective ends of the crossflow fan 30, and the bracket 55 is then attached to the inside of the body 10 by screws extending through the screw holes 57 of the bracket 55.

The driving motor 32 is joined to the inside of the body 10, thereby completing the crossflow fan assembly.

Accordingly, one end of the crossflow fan 30 is rotatably supported by the bearing 53 and the shaft 56 that constitutes the inventive crossflow fan supporting device 50, and the other end of the crossflow fan 30 is fixed to the spindle 32a of the driving motor 32. If the driving motor 32 is actuated after the assembling of the crossflow fan 30 is completed, the crossflow fan 30 is rotated by the spindle 32a.

Figure 3:
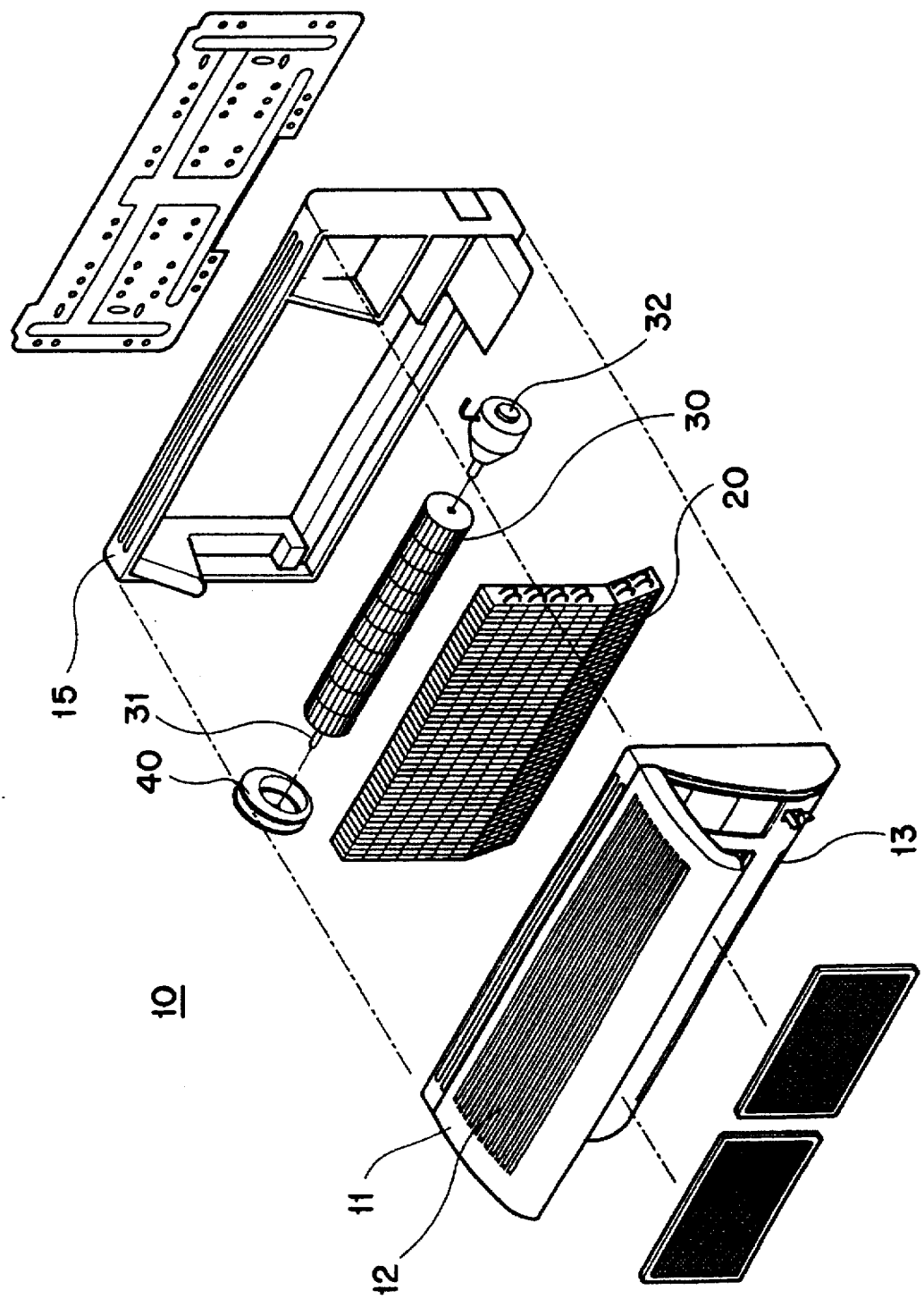
FIG. 3 depicts an exploded perspective view of a conventional indoor unit of an air conditioner.
Figure 4:
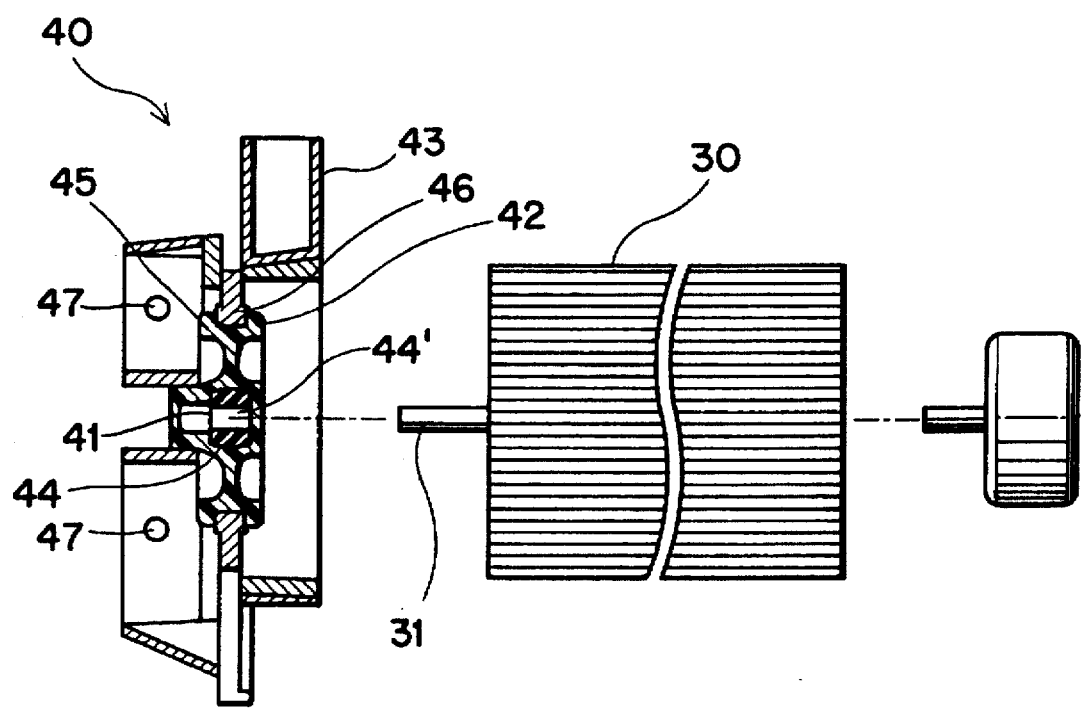
FIG. 4 depicts the conventional crossflow fan supporting device of FIG. 1 which is joined to a crossflow fan.

According to the present invention, the shaft of the crossflow fan supporting device that serves to support the crossflow fan rotatably extends toward the inside of the body 10 rather than toward the exterior of the body as in FIG. 3 so that the shaft can be deeply inserted into the crossflow fan. Therefore, the inventive crossflow fan supporting device can prevent the crossflow fan from being dislodged from the body of the air conditioner against any outside shock due to a mover's careless handling, and enhances users' confidence in the product.

As discussed above, since the bearing housing that rotatably supports the shaft is formed as an integral part of the crossflow fan 30 by insert-injection molding, the present invention ensures a reduction in assembling hours and prevention of defects in workmanship that may occur by handwork, which enhances productivity.

Besides, the shaft of the crossflow fan supporting device extends to the inside of the crossflow fan, passing through the bearing housing in such a manner that there is no need to adjust the length of the shaft to the size of an air conditioner. Thus, the crossflow fan supporting device of the present invention can be applied to most air conditioners with various capacities, so long as the shaft fits well the diameter of the insert hole into which the bearing is inserted. In other words, the inventive crossflow fan supporting device can be universal, which lowers overall production costs and offers the improved assembly.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An air conditioner, comprising:
   a housing body;
   a heat exchange disposed in the housing body;
   a motor disposed in the housing body;
   a crossflow fan disposed in the housing body and coupled at one end thereof to the motor to be rotated thereby about an axis for circulating air across the heat exchanger;
   a bearing housing disposed on the crossflow fan at another end thereof;

a bearing disposed in the bearing housing and having a center hole aligned with the axis and;

a bracket affixed to the housing body and including a shaft extending toward the crossflow fan and passing through the center hole to rotatably support the crossflow fan.

2. The air conditioner according to claim 1 wherein the shaft extends completely through the bearing and bearing housing such that an inner end of the shaft is disposed within the crossflow fan and is spaced from the bearing and bearing housing.

3. The air conditioner according to claim 1 wherein the bearing housing is integrally formed with the crossflow fan by insert-injection molding.

4. The air conditioner according to claim 1 wherein the bearing is formed of an elastic material.

5. The air conditioner according to claim 4 wherein the elastic material is rubber.

* * * * *